United States Patent
Liu et al.

(10) Patent No.: US 9,446,416 B2
(45) Date of Patent: Sep. 20, 2016

(54) COMPOSITION AND METHOD FOR IMPROVEMENT IN FROTH FLOTATION

(71) Applicant: ECOLAB USA INC., Naperville, IL (US)

(72) Inventors: Jianjun Liu, Aurora, IL (US); Kevin L. O'Brien, St. Charles, IL (US)

(73) Assignee: Ecolab USA Inc., St. Paul, MN (US)

( * ) Notice: Subject to any disclaimer, the term of this patent is extended or adjusted under 35 U.S.C. 154(b) by 458 days.

(21) Appl. No.: 13/687,042

(22) Filed: Nov. 28, 2012

(65) Prior Publication Data

US 2014/0144815 A1    May 29, 2014

(51) Int. Cl.
| | |
|---|---|
| *B03D 1/02* | (2006.01) |
| *B01D 21/01* | (2006.01) |
| *C02F 1/24* | (2006.01) |
| *C02F 1/52* | (2006.01) |
| *B03D 1/004* | (2006.01) |
| *B01D 21/00* | (2006.01) |

(52) U.S. Cl.
CPC ............ *B03D 1/004* (2013.01); *B01D 21/0084* (2013.01); *B01D 21/01* (2013.01); *B03D 1/025* (2013.01); *C02F 1/24* (2013.01); *C02F 1/5263* (2013.01); *C02F 1/5272* (2013.01); *B03D 2201/007* (2013.01); *B03D 2203/08* (2013.01)

(58) Field of Classification Search
CPC .......... B03D 1/01; B03D 1/004; B03D 1/02; B03D 1/025; B03D 1/028; B03D 1/016; B03D 1/018; B03D 1/023; B03D 2201/007; B03D 2203/08; B01D 21/01; B01D 21/0084; C02F 1/24; C02F 1/52; C02F 1/5263; C02F 1/5272; C02F 1/54

USPC ............... 210/702–705, 708, 723–735; 209/164–167

See application file for complete search history.

(56) References Cited

U.S. PATENT DOCUMENTS

| | | | | |
|---|---|---|---|---|
| 1,987,454 | A * | 1/1935 | Vandercock | C22B 11/08 75/388 |
| 2,163,701 | A * | 6/1939 | Ried | 209/166 |
| 2,177,985 | A * | 10/1939 | Harris | 209/166 |
| 2,255,139 | A * | 9/1941 | Vogel-Jorgensen | 209/166 |
| 2,297,689 | A * | 10/1942 | O'Meara | 209/166 |
| 3,331,505 | A * | 7/1967 | Mercade | 209/11 |
| 3,640,382 | A * | 2/1972 | Jepsen | 209/5 |
| 3,929,629 | A * | 12/1975 | Griffith | B03D 1/016 209/167 |

(Continued)

FOREIGN PATENT DOCUMENTS

| | | |
|---|---|---|
| CA | 2768522 A1 | 8/2012 |
| WO | 2011032258 A1 | 3/2011 |

OTHER PUBLICATIONS

Norma Moss Gric and Brian Dymond Lric, Flocculation: Theory & Application, 1978, pp. 2-4 and 7.

(Continued)

*Primary Examiner* — Joseph Drodge
(74) *Attorney, Agent, or Firm* — Dorsey & Whitney LLP

(57) ABSTRACT

The invention provides methods and compositions for improving a froth flotation type separation. The method uses a thickener to improve the effectiveness of an emulsifier. The improvement allows for low dosages of emulsifier to work well so the emulsifier does not cancel out the effectiveness of other additives in the slurry such as collectors, frothing agents, regulators, depressors, deactivators, and/or activators.

15 Claims, 2 Drawing Sheets

(56) References Cited

U.S. PATENT DOCUMENTS

| | | | |
|---|---|---|---|
| 3,974,116 A * | 8/1976 | Lissant | 524/436 |
| 4,209,301 A * | 6/1980 | Nicol | B03B 1/04 |
| | | | 210/929 |
| 4,213,853 A * | 7/1980 | Jameson | 209/166 |
| 4,283,277 A * | 8/1981 | Brison et al. | 209/166 |
| 4,340,467 A * | 7/1982 | Wang | B03D 1/004 |
| | | | 209/166 |
| 4,363,724 A * | 12/1982 | Panzer | B03D 1/02 |
| | | | 209/166 |
| 4,725,351 A * | 2/1988 | Mehrotra | 209/166 |
| 4,734,206 A * | 3/1988 | Clayfield | B03B 9/005 |
| | | | 209/5 |
| 4,756,823 A * | 7/1988 | O'Neill et al. | 209/166 |
| 4,830,739 A * | 5/1989 | Hellsten et al. | 209/166 |
| 4,851,036 A * | 7/1989 | Anthes et al. | 209/164 |
| 5,304,317 A * | 4/1994 | Barwise et al. | 252/61 |
| 5,379,902 A * | 1/1995 | Wen et al. | 209/166 |
| 5,653,886 A * | 8/1997 | Kerr et al. | 210/727 |
| 5,720,887 A | 2/1998 | Vasconcellos et al. | |
| 5,993,670 A | 11/1999 | Knauer | |
| 6,217,778 B1 | 4/2001 | Shing et al. | |
| 6,827,220 B1 * | 12/2004 | Young et al. | 209/166 |
| 7,553,984 B2 * | 6/2009 | Rau et al. | 558/199 |
| 8,093,303 B2 * | 1/2012 | Hovland et al. | 516/78 |
| 8,123,042 B2 * | 2/2012 | Tran | 209/166 |
| 9,068,776 B2 | 6/2015 | Bugg et al. | |
| 2001/0010198 A1 | 8/2001 | Forbes | |
| 2004/0055962 A1 | 3/2004 | Golden | |
| 2005/0220687 A1 * | 10/2005 | Miller et al. | 423/206.2 |
| 2007/0187332 A1 | 8/2007 | Whittaker et al. | |
| 2010/0000913 A1 * | 1/2010 | Hurd et al. | 209/166 |
| 2010/0101981 A1 | 4/2010 | Moffett et al. | |
| 2010/0181520 A1 * | 7/2010 | Gupta et al. | 252/61 |
| 2011/0017676 A1 * | 1/2011 | Franks et al. | 210/705 |
| 2011/0198296 A1 * | 8/2011 | Child | 210/706 |
| 2011/0203999 A1 | 8/2011 | Simpson et al. | |
| 2011/0253599 A1 | 10/2011 | Cross et al. | |
| 2011/0272503 A1 * | 11/2011 | Miller et al. | 241/24.1 |
| 2012/0138542 A1 | 6/2012 | Dang-Vu et al. | |
| 2012/0318718 A1 | 12/2012 | Simpson et al. | |
| 2013/0336877 A1 | 12/2013 | Soane et al. | |
| 2014/0054232 A1 | 2/2014 | Duttlinger, Jr. et al. | |
| 2015/0176893 A1 | 6/2015 | Revington et al. | |
| 2015/0259231 A1 | 9/2015 | Webber et al. | |

OTHER PUBLICATIONS

International Preliminary Report on Patentability dated Feb. 24, 2015 in PCT/US2013/055913.

International Search Report dated Nov. 19, 2013 in PCT/US2013/055913.

Demoz and Mikula, "Role of Mixing Energy in the Flocculation of Mature Fine Tailings", J. Environ. Eng., 2012, 138 (1), 129-136.

Energy Resources Conservation Board of Alberta, "Directive 074: Tailings Performance Criteria and Requirements for Oil Sands Mining Schemes", Feb. 3, 2009. pp. 1-14.

* cited by examiner

COMPOSITION AND METHOD FOR IMPROVEMENT IN FROTH FLOTATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to novel methods, compositions, and apparatuses for improving the effectiveness of froth flotation beneficiation processes. In a beneficiation process, two or more materials which coexist in a mixture (the fines) are separated from each other using chemical and/or mechanical processes. Often one of the materials (the beneficiary) is more valuable or desired than the other material (the gangue).

As described for example in U.S. Pat. Nos. 4,756,823, 5,304,317, 5,379,902, 7,553,984, 6,827,220, 8,093,303, 8,123,042, and in Published US Patent Applications 2010/0181520 A1 and 2011/0198296, one form Ff beneficiation is froth flotation separation. In froth flotation separation the fines are mixed with water to form slurry. The slurry is then sparged to form bubbles which rise up out of the slurry. The more hydrophobic material (the concentrate) adheres to and rises up with the bubbles and gathers in a froth layer above the slurry. The froth layer is then is deposited on a launder where the concentrate gathers. The less hydrophobic material (the tailings) remains behind in the slurry.

Two common forms of flotation separation processes are direct flotation and reverse flotation. In direct flotation processes, the concentrate is the beneficiary and the tailings are the gangue. In reverse flotation processes, the gangue constituent is floated into the concentrate and the beneficiary remains behind in the slurry. The object of the all flotation is to separate and recover as much of the valuable constituent(s) of the fine as possible in as high a concentration as possible which is then made available for further downstream processing steps.

Froth flotation separation can be used to separate solids from solids (such as the constituents of mine ore) or liquids from solids or from other liquids (such as the separation of bitumen from oil sands). When used on solids, froth separation also includes having the solids comminuted (ground up by such techniques as dry-grinding, wet-grinding, and the like). After the solids have been comminuted they are more readily dispersed in the slurry and the small solid hydrophobic particles can more readily adhere to the sparge bubbles.

There are a number of additives that can be added to increase the efficiency of a froth flotation separation. Collectors are additives which adhere to the surface of concentrate particles and enhance their overall hydrophobicity. Gas bubbles then preferentially adhere to the hydrophobicized concentrate and it is more readily removed from the slurry than are other constituents, which are less hydrophobic or are hydrophilic. As a result, the collector efficiently pulls particular constituents out of the slurry while the remaining tailings which are not modified by the collector, remain in the slurry. This process can also or instead utilize chemicals, which increase the hydrophilic properties of materials selected to remain within the slurry. Examples of collectors include oily products such as fuel oil, tar oil, animal oil, vegetable oil, fatty acids, fatty amines, and hydrophobic polymers. Other additives include frothing agents, regulators, depressors (deactivators) and/or activators, which enhance the selectivity of the flotation step and facilitate the removal of the concentrate from the slurry.

Because collectors adhere to the surfaces of concentrate particles, their effectiveness is dependent on the nature of the interactions that occur between the collectors and the concentrate particles. Unfortunately contradictory principles of chemistry are at work in froth flotation separation which forces difficulties on such interactions. Because froth flotation separation relies on separation between more hydrophobic and more hydrophilic particles, the slurry medium often includes water. Because however many commonly used collectors are themselves hydrophobic, they do not disperse well in water which makes their interactions with concentrate particles difficult or less than optimal.

One method that has been used to better disperse water immiscible collectors in slurry is through the use of chemical agents such as emulsifiers to disperse the collector in the slurry as an oil-in water type emulsion. Unfortunately here too contradictory chemistry has hampered this attempt. To make oil-in-water emulsions stable sufficient amounts of emulsifiers have to be used to cover the surface of oil droplets with a hydrophobic tail portion and the water phase with a hydrophilic group. However, when used in these amounts emulsifiers reduce the hydrophobicity of the collector thus defeating the entire purpose of being a collector. As a result water immiscible collector performance remains degraded because of either poor dispersing or because of impaired hydrophobicity. In addition using sufficient emulsifiers to disperse collectors often causes interferes with other additives (frothing agents in particular).

Thus it is clear that there is definite utility in improved methods, compositions, and apparatuses for dispersing collectors in froth separation slurry. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed to a method of enhancing the performance of a water-immiscible collector in a froth flotation separation of slurry in a medium. The method comprises the steps of making stable oil-in-water type collector emulsion with emulsifier and thickener, blending the above emulsion, the medium, fines, and other additives, and removing concentrate from the slurry by sparging the slurry.

The collector emulsion formed by emulsifier and thickener may improve the efficiency of froth separation process. More concentrate may be removed than if a greater amount of emulsifier had been used in the absence of the thickener, wherein the emulsifier is used in an amount such that in the absence of the thickener more emulsifier would have caused less concentrate to be removed.

The emulsifier may have a hydrophobic portion and a hydrophilic portion, the hydrophilic portion being such amount that the collector droplets are hydrophobic enough to react with concentrate materials, and in the absence of the thickener the oil-in-water emulsion would have been not stable enough for storage and transportation but in the presence of thickener the oil-in-water emulsion would be both hydrophobic and stable. The emulsifier may not completely surround the collector droplets but forms an emulsion that is as effective at dispersing the collector into aqueous slurry as an emulsion in which emulsifier does completely surround the collector droplets. The emulsifier may have an HLB of at least 10. The thickener may not be a flocculant. The thickener may be a substance that can increase viscosity of a solution or liquid/solid mixture, and has an RSV of at least 10 dL/g. The collector may be at least one item selected from the list consisting of petroleum based oil products, natural lipids, modified natural lipids, hydrophobic organic compounds, and any combination thereof. The petroleum based oil products may be selected from but not limited to fuel oils, decant oils, light cycle oils, paraffinic oils, naphthenic oils, mineral seal oils, mineral oils, residual or bottom of distillation, and any combination thereof. The natural lipids may be of animal and vegetable original, such as animal fat/oil, vegetable oils such as soybean oil, corn oil, linseed oil, cotton seed oil palm oil, coconut oil, and any combination thereof. Modified natural lipids may be one or more reaction products of lipids or mixtures of lipids by either trans-esterification, saponification followed by acidulation, or by inter-esterification. Hydrophobic organic compound may be at least one item selected from fatty acids, neutralized fatty acids, soaps, fatty amine compounds, low HLB surfactants, hydrophobic polymer, silicon oil, xanthates, xanthogen formats, thionocarbamates, dithiophosphates, sodium salts of dithiophosphates, zinc salts of dithiophosphates, mercaptans, mercaptobenzothiazole, ethyl octylsulfide, and any combination thereof. The collector may contain other reagents such as frother.

The emulsifier may be one item selected from the list consisting of: ethoxylated sobitan esters, nonylphenol, soy lecithin, non-soy lecithin, sodium stearoyl lactylate, DATEM, Ester of Monoglyceride, surfactants, detergents, and any combination thereof. The collector may be immiscible with the slurry medium so dispersion of the collector in the slurry is inherently thermodynamically unfavorable but in the presence of emulsifier and thickener such dispersion is kinetically favorable. The amount of emulsifier added to the slurry may be insufficient to overcome the thermodynamic un-favorability but the presence of the thickener makes the emulsification of the collector kinetically favorable. The thickener may be selected from the list consisting of polysaccharides, natural gums, vegetable gum, starch, pectin, proteins, collagen egg whites, fullcellaran, gelatin, high molecular weight polymers, latex polymers, dry polymers, and polyacrylamide, natural gum derivative, and any combination thereof.

At least two of the collector emulsion, medium, fines and other additives may be mixed in any order. While making the emulsion, collector, emulsifier, thickener, water and other additives may be mixed in any order.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1:
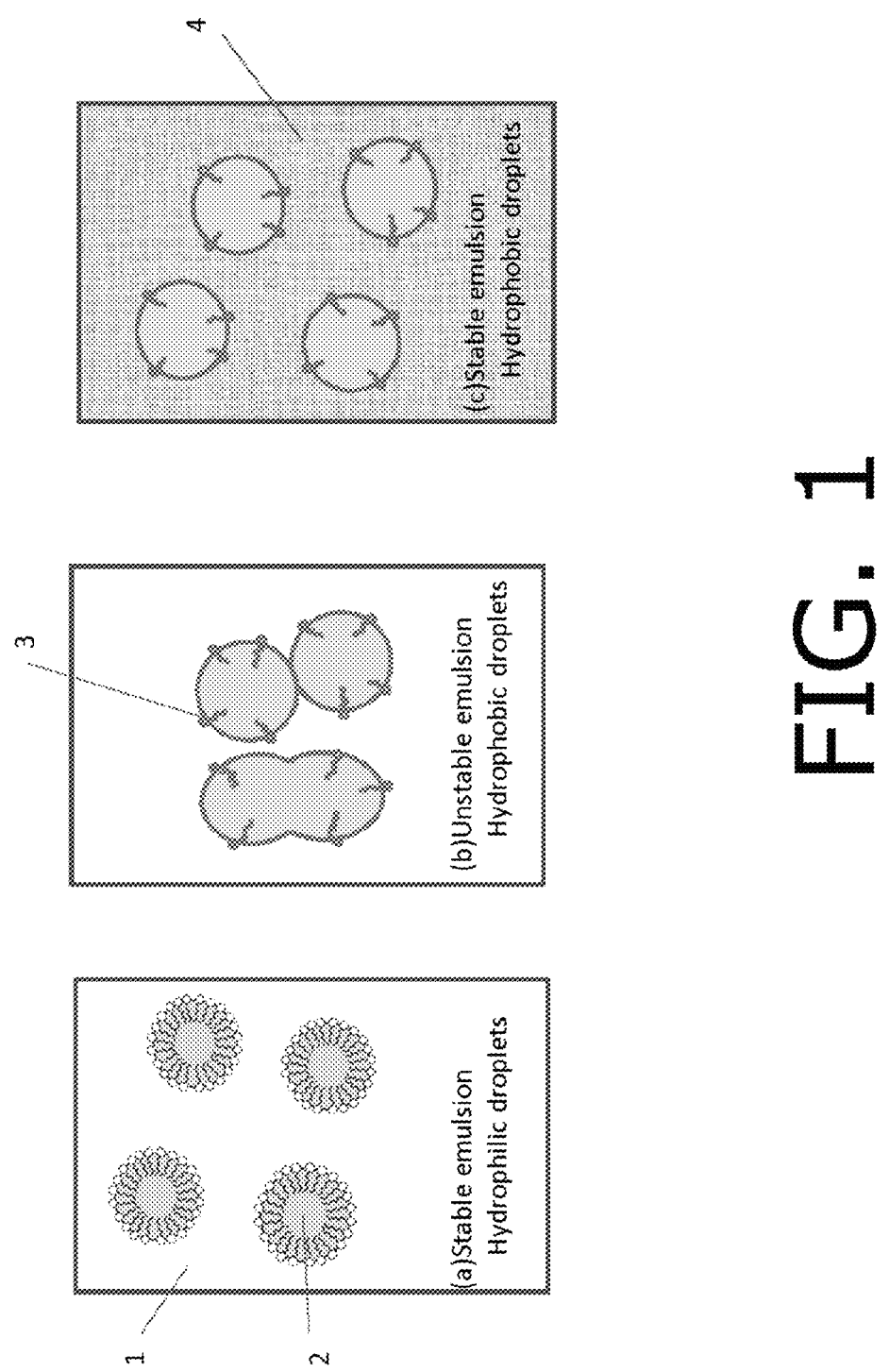
FIG. 1 is an illustration of emulsions utilizing the invention.

The following definitions are provided to determine how terms used in this application, and in particular how the claims, are to be construed. The organization of the definitions is for convenience only and is not intended to limit any of the definitions to any particular category.

"Collector" means a composition of matter that selectively adheres to a particular constituent of the fine and facilitates the adhesion of the particular constituent to the micro-bubbles that result from the sparging of a fine bearing slurry.

"Comminuted" means powdered, pulverized, ground, or otherwise rendered into fine solid particles.

"Concentrate" means the portion of fine which is separated from the slurry by flotation and collected within the froth layer.

"Consisting Essentially of" means that the methods and compositions may include additional steps, components, ingredients or the like, but only if the additional steps, components and/or ingredients do not materially alter the basic and novel characteristics of the claimed methods and compositions.

"Fine" means a composition of matter containing a mixture of a more wanted material, the beneficiary and a less wanted material, the gangue.

"Frother" means a composition of matter that enhances the formation of the micro-bubbles and/or preserves the formed micro-bubbles bearing the hydrophobic fraction that result from the sparging of slurry.

"HLB" means the hydrophillic-lipophillic balance of an emulsifier which is a measure of the degree to which it is hydrophilic or lipophilic, it can be determined by the equation:

$$HLB=20*Mh/M$$

in which Mh is the molecular mass of the hydrophilic portion of the Molecule, and M is the molecular mass of the whole molecule, giving a result on a scale of 0 to 20. An HLB value of 0 corresponds to a completely lipidphilic/hydrophobic molecule, and a value of 20 corresponds to a completely hydrophilic/lypidphobic molecule. HLB values are characterized as:

HLB <10: Lipid soluble (water insoluble)
HLB >10: Water soluble (lipid insoluble)
HLB from 4 to 8 indicates an anti-foaming agent
HLB from 7 to 11 indicates a W/O (water in oil) emulsifier
HLB from 12 to 16 indicates O/W (oil in water) emulsifier
HLB from 11 to 14 indicates a wetting agent
HLB from 12 to 15 indicates a detergent
HLB of 16 to 20 indicates a solubiliser or hydrotrope.

"Natural Gum" means a polysaccharide characterized as being originally of natural origin and which when placed in a solution imposes a large viscosity increase in said solution even when in a small concentration, natural gum includes a number of plant resins and includes but is not limited to seaweed polyelectrolytes such as agar, alginic acid, sodium alginate, carrageenan, botanical polyelectrolytes such as gum arabic from acacia tree sap, gum ghatti from anogeissus tree sap, gum tragacanth from astragalus shrub sap, karaya gum from anogeissus tree sap, gum tragacanth from astragalus shrub sap, kararya gum from sterculia tree sap, uncharged botanicals such as guar gum from guar beans, locust bean gum from carob tree seeds, beta-glucan from oat and barley bran, chicle gum from chicle trees, dammar gum from dipterocarpaceae tree sap, glucommannan from koniac plants, mastic gum from mastic trees, psyllium seed husks from plantago plants, spruce gum from spruce trees, tara gum from tara tree seeds, and bacterial fermentation products such as gellan gum and xantham gum, "natural gum" also includes natural gum derivatives.

"Natural Gum Derivative" means a natural gum polysaccharide which has undergone some measure of chemical substitution of one or more of the subgroups (e.g. carboxymethyl, hydroxypropyl) in one, some or all of the monomer units in the polysaccharide backbone, the substitute constituents typically comprise one or more of sulfate, carboxylic acid. (found in carragenan, alginate, pectin), carboxylic ester, pyruvic acid (found in pectin, xanthan, gum, zooglan, and methylan), carboxymethyl, hydroxypropyl, methyl, methylethyl, hydroxyethyl, hydroxyethylmethyl and the like.

"Polysaccharide" means a polymeric carbohydrate having a plurality of repeating units comprised of simple sugars, the C—O—C linkage formed between two such joined simple sugar units in a polysaccharide chain is called a glycosidic linkage, and continued condensation of monosaccharide units will result in polysaccarides, common polysaccharides are amylose and cellulose, both made up of glucose monomers, polysaccharides can have a straight chain, or branched polymer backbone including one or more sugar monomers, common sugar monomers in polysaccharides include glucose, galactose, arabinose, mannose, fructose, rhamnose, and xylose.

"Slurry" means a mixture comprising a liquid medium within which fines (which can be liquid and/or finely divided solids) are dispersed or suspended, when slurry is sparged, the tailings remain in the slurry and at least some of the concentrate adheres to the sparge bubbles and rises up out of the slurry into a froth layer above the slurry, the liquid medium may be entirely water, partially water, or may not contain any water at all.

"Surfactant" is a broad term which includes anionic, nonionic, cationic, and zwitterionic surfactants. Enabling descriptions of surfactants are stated in *Kirk-Othmer, Encyclopedia of Chemical Technology*, Third Edition, volume 8, pages 900-912, and in *McCutcheon's Emulsifiers and Detergents*, both of which are incorporated herein by reference.

"Sparging" means the introduction of gas into a liquid for the purpose of creating a plurality of bubbles that migrate up the liquid.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims.

In at least one embodiment a froth flotation separation process is enhanced by the addition to the slurry of an inventive composition. The composition comprises a collector, an emulsifier, and a thickener. In at least one embodiment the emulsifier is added in an amount that is insufficient to effectively disperse the collector in the slurry on its own. The thickener however increases the effectiveness of the emulsifier so when present, the emulsifier disperses the collector more effectively than it would have in the absence of the thickener. In at least one embodiment the emulsifier has an HLB of at least 10. In at least one embodiment the thickener is a non-flocculating thickener. In at least one embodiment the thickener has an HLB of no more than 4. In at least one embodiment the thickener has an RSV of at least 10 dL/g. In at least one embodiment the composition is an oil-in water type emulsion. In at least one embodiment the emulsion is stable enough for storage and transport prior to being added to slurry. In at least one embodiment the emulsion is stable for at least 1 year.

Without being limited to a particular theory of the invention and in particular to the construal of the claims, the believed roles of emulsifier and thickener in the collector emulsion are illustrated in FIG. 1. Within FIG. 1 are shown aqueous medium (1), oily collector droplets (2), emulsifiers (3), and thickener solution (4). FIG. 1 illustrates how the invention allows for the formation of a stable emulsion of hydrophobic droplets (1c) in contrast to an unwanted stable emulsion of hydrophilic droplets (1b) and an unwanted unstable emulsion of hydrophobic droplets (1a). Scenario (1a) can occur when there is sufficient emulsifier so the emulsion is stable but has hydrophilic droplets. Scenario (1b) can occur when there is insufficient emulsifier so there are hydrophobic droplets but they are not stable. Scenario (1c) can occur when insufficient emulsifier and some thickener are present and results in a stable emulsion with hydrophobic droplets.

Because collectors are so hydrophobic, the more comprehensively a collector droplet is covered with emulsifier, the more easily it will disperse in slurry. Concomitantly however the more comprehensively a collector droplet is covered with emulsifier, the more hydrophilic the collector droplet becomes. This implies that the fewer interactions occur between the collector and the concentrate in this case. By using insufficient amount of emulsifiers, the resultant collector emulsion would be not stable and would frustrate the intended purpose of a good dispersion of collector into aqueous slurry. By using insufficient dosages of emulsifier and some amount of the thickener can solve these two issues. It is believed that the thickener increases the viscosity of collector emulsion to reduce the collision probability between collector droplets and hence increases the stability of collector emulsion. This allows for fewer emulsifiers to effectively emulsify the water immiscible collector into stable emulsion while leaving them a sufficiently uncovered surface to show sufficient hydrophobicity to the concentrate particles. This allows the invention to overcome a notorious problem inherent in collector dispersions.

While thickeners are known to be effective in stabilizing some kinds of dispersions, the teachings of the prior art suggest that they would not be useful in improving the performance of water immiscible collectors in froth flotation separation processes. The prior art teaches that the HLB of the emulsifier must be carefully balanced (see U.S. Pat. No. 5,379,902 col. 8 lines 52-68). Too low an HLB and the emulsifier will not effectively disperse. As described in scientific paper *Preparation and application of DR kerosene emulsion*, by Y. T. Lu et al., Xuanmei Jishu, vol. 6 pp. 76-78 (2003), if the HLB of the emulsifier is too low, the size of its hydrophobic portion outweighs the effects of its hydrophilic portion and it forces the emulsion to assume a water-in oil configuration. In order to disperse effectively into aqueous slurry, however, the water immiscible collector must be in the form of an oil-in-water emulsion. In addition sufficient amounts of emulsifier are critical to make the emulsion stable (i.e. keeping the droplets stable before they are added to the slurry) for effective dispersion. In at least one embodiment of the invention, the thickener allows for so few high HLB emulsifier molecules to surround the collector droplet that despite the size of the hydrophobic portions, they can remain in a stable oil-in water emulsion state.

While U.S. Pat. No. 4,756,823 describes using a flocculent to stabilize a collector emulsion it does not teach this invention. This is because it makes no reference to the ability of a non-flocculating thickener to stabilize a collector emulsion. Rather U.S. Pat. No. 4,756,823 anticipates using the flocculating effect to compensate for the oil-in water emulsion tendency and does not contemplate using other thickener properties to enhance the emulsion.

In at least one embodiment the composition added to the slurry comprises at least one of the collector compositions and/or other compositions described in scientific papers: *Application research on emulsive collector for coal flotation*, by C. L. Han et al., Xuanmei Jishu, vol. 3 pages 4-6 (2005), *The use of reagents in coal flotation*, by J. S. Laskowski, Proceedings of the UBC-McGill Bi-Annual International Symposium on Fundamentals of Mineral Processing, Vancouver, BC, CIMM, Aug. 20-24 (1995), *Effect of collector emulsification on coal flotation kinetics and on recovery of different particle sizes*, by A. M. Saleh, Mineral Processing on the verge of the 21st Century, Proceedings of the International Mineral Processing Symposium, 8th, Antalya, Turkey, Oct. 16-18, 2000, pp. 391-396 (2000), *Application of novel emulsified flotation reagent in coal slime flotation*, by W W Xie, Xuanmei Jishu vol. 2 pp. 13-15 (2007), *A study of surfactant/oil emulsions for fine coal flotation*, by Q. Yu et al., Advance in Fine Particle Processing, Proc. Int. Symp. pp. 345-355, (1990), and *Evaluation of new emulsified floatation reagent for coal*, by S. Q. Zhu, Science Press Beijing, vol. 2 pp. 1943-1950 (2008).

In at least one embodiment at least part of the collector is at least one item selected from the list consisting of: fatty acids, neutralized fatty acids, soaps, amine compounds, petroleum-based oily compounds (such as diesel fuels, decant oils, and light cycle oils), organic type collector, and any combination thereof.

In at least one embodiment the organic type collector is a sulfur containing material which includes such items as xanthates, xanthogen formats, thionocarbamates, dithiophosphates (including sodium, zinc and other salts of dithiophosphates), and mercaptans (including mercaptobenzothiazole), ethyl octylsulfide, and any combination thereof.

In at least one embodiment the collector includes "extender oil" in which at least one second collector is used to reduce the required dosage of at least one other more expensive collector.

In at least one embodiment the emulsifier comprises at least one of the surfactants described in the scientific textbook *Emulsions: Theory and Practice*, $3^{rd}$ Edition, by Paul Becher, Oxford University Press, (2001).

In at least one embodiment the surfactant is at least one item selected from the list consisting of: ethoxylated sobitan esters (such as Tween 81 by Sigma Aldrich), soy lecithin, sodium stearoyl lactylate, DATEM (Diacetyl Tartaric Acid) Ester of Monoglyceride), surfactants, detergents, and any combination thereof.

In at least one embodiment the collector is immiscible with the slurry medium and dispersion of the collector in the slurry is inherently thermodynamically unfavorable but the inventive composition makes the dispersion kinetically favorable. In at least one embodiment the amount of emulsifier added to the slurry is insufficient to overcome the thermodynamic un-favorability but the presence of the thickener makes the emulsification of the collector kinetically favorable. In at least one embodiment, but for the presence of the thickener, the collector would undergo flocculation in the slurry.

In at least one embodiment the thickener is selected from the list consisting of: kerosene, diesel oil, polysaccharides (including but not limited to natural gums, vegetable gum, starch, and pectin), proteins (including but not limited to collagen egg whites, fullcellaran, and gelatin), high molecular weight polymers (including but not limited to latex polymers, dry polymers, and polyacrylamide), natural gum derivative, and any combination thereof.

In at least one embodiment the following items are added to a slurry medium: fines, collector, emulsifier, and thickener. The items can be added simultaneously or in any possible order. Any one, some, or all of the items can be pre-mixed together before being added to the slurry medium. The slurry medium can be any liquid including but not limited to water, alcohol, aromatic liquid, phenol, azeotropes, and any combination thereof. Optionally the items can include one or more other additives.

EXAMPLES

The foregoing may be better understood by reference to the following examples, which are presented for purposes of illustration and are not intended to limit the scope of the invention.

A number of collector emulsion formulations were prepared and tested. The formulation's effectiveness on froth flotation separation, were tested in a 1.5 L Denver cell. The results show that emulsification of collector can substantially reduce the required dosage of a collector while providing the same performance and/or it can improve the performance of a collector.

Example 1

GFA Emulsions

GFA is a mixture of glycerin and fatty acid extracted as a distinct phase byproduct from an ethanol production process. A sample of GFA was emulsified with a surfactant as emulsifier and with xanthan gum or anionic polyacrylamide polymer as thickening agents.

Formula 1: 38.5% GFA, 1.5% emulsifier (HLB10.9), and 60% water

Formula 2: 39.5% GFA, 0.5% emulsifier (HLB10.9), and 60% water

Figure 2:
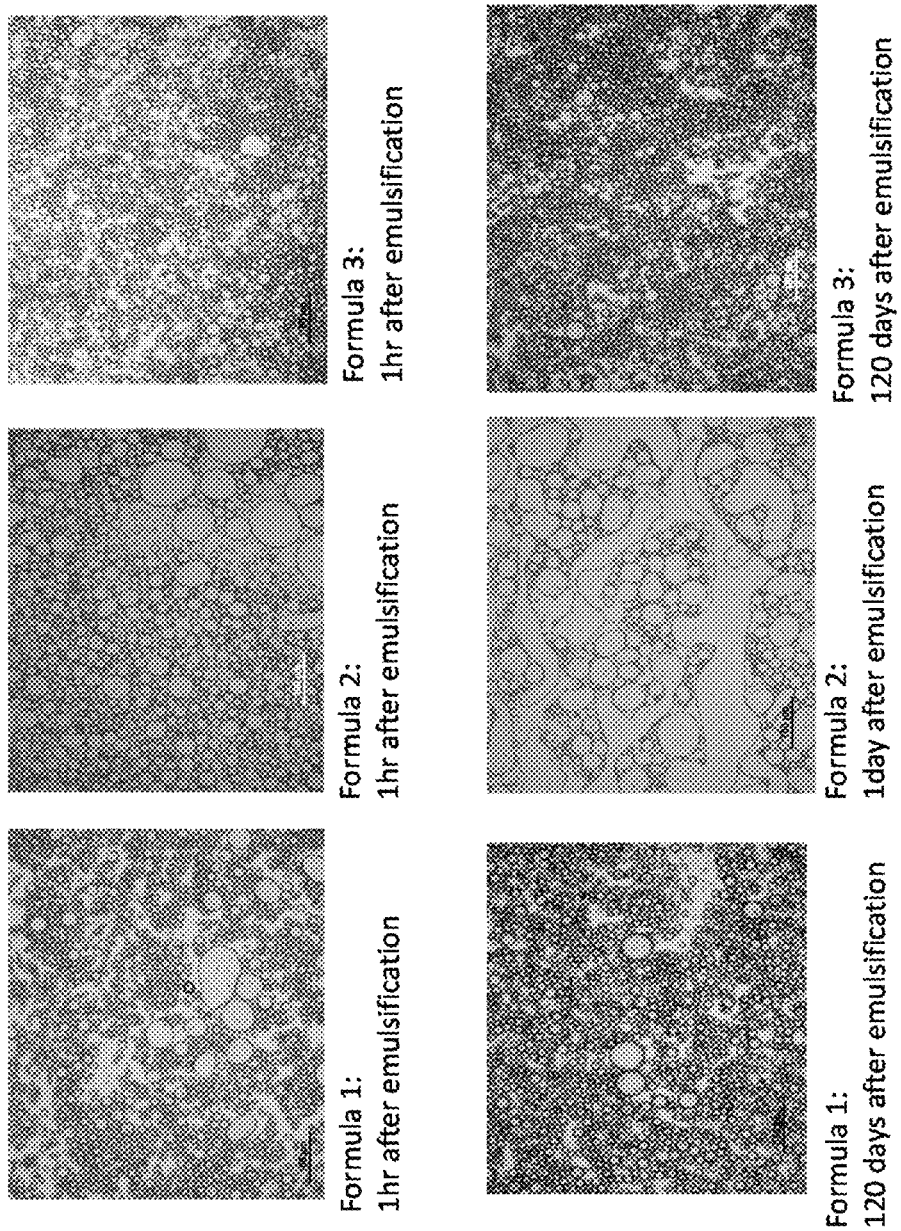
FIG. 2 is a number of optical images of collector emulsions in which the invention as used.

Formula 3: 39.5% GFA, 0.5% emulsifier (HLB10.9), 0.05% xanthan gum, and 59.95% water Formula 4: 39.5% GFA, 0.5% emulsifier (HLB10.9), 0.05% polyacrylamide and 59.95% water Stability tests indicated that formula 1, 3 and 4 can be stable over 120 days while formula 2 is stable less than 1 day. The optical microscopy images of emulsions were shown in FIG. 2.

Table 1 lists the coal flotation results with above formulas in a 1.5 L Denver cell. The coal slurry sample was from coal mine ore and contained 48% ash. 135 g/t (ton of dry coal feed) propene hydroformylation was used as frother and 90 g/t emulsion was used as collector. For the purpose of comparison, 90 g/t and 45 g/t oily GFA were also used as collector for the flotation. The results indicated that formula 1 (containing higher emulsifier) underperforms 45 g/t and 90 g/t oily GFA while formula 2 (containing lower emulsifier) competes with 45 g/t oily GFA but underperforms 90 g/t oily GFA. Emulsion formulas 3 and 4 (containing lower emulsifier and thickener) perform competitively with 90 g/t oily GFA, and outperform 45 g/t GFA This representative example clearly demonstrates the benefits of including a thickener with the emulsification of a collector.

TABLE 1

Coal flotation test results, flotation time 2 min.

| Collector | | Clean Coal | | |
| --- | --- | --- | --- | --- |
| ID | Dosage, g/t | Yield, % | Ash, % | Recovery, % |
| GFA | 90 | 51.38 | 16.21 | 81.66 |
| GFA | 45 | 49.36 | 15.75 | 77.98 |
| Formula 1 | 90 | 44.51 | 15.46 | 71.74 |
| Formula 2 | 90 | 48.44 | 15.77 | 77.95 |
| Formula 3 | 90 | 52.78 | 16.35 | 82.93 |
| Formula 4 | 90 | 52.74 | 16.26 | 83.77 |

Example 2

Diesel Fuel Emulsion

2 diesel fuel was emulsified with a surfactant as emulsifier and xanthan gum or anionic polyacrylamide polymer as thickening agent.

Formula 5: 39.5% 2# diesel fuel, 0.5% surfactant (HLB10.9), 0.05% xanthan gum and 59.95% water.

Formula 6: 39.5% 2# diesel fuel, 0.5% surfactant (HLB10.9), 0.05% polyacrylamide and 59.95% water.

The coal flotation results with above formula as collectors were obtained in a 1.5 L Denver cell as is shown in table 2. The coal sample in the slurry was from coal mine ore and contained 48% ash. 90 g/t (ton of dry coal feed) propene hydroformylation was used as frother and 90 g/t emulsion was used as collector. For the purpose of comparison, 90 g/t and 45 g/t 2# diesel were also used as collector for the flotation. The results demonstrate that the emulsion formula 5 outperformed a 45 g/t diesel while emulsion formula 6 performs competitively with 90 g/t diesel, and outperforms 45 g/t diesel. These representative examples also demonstrate that emulsification of collector with a thickener improves collector performance and/or reduce the required dosage of the collector.

TABLE 2

Coal flotation test results, flotation time 2 min.

| Collector | | Clean Coal | | |
| --- | --- | --- | --- | --- |
| ID | Dosage, g/t | Yield, % | Ash, % | Recovery, % |
| #2 Diesel | 90 | 42.58 | 15.07 | 69.23 |
| #2 Diesel | 45 | 39.87 | 15.03 | 64.04 |
| Formula 5 | 90 | 41.41 | 15.68 | 66.79 |
| Formula 6 | 90 | 42.43 | 14.69 | 69.33 |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and/or incorporated herein. In addition the invention encompasses any possible combination that also specifically excludes any one or some of the various embodiments described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of froth flotation separation, the method comprising:
    making an emulsion by adding an emulsifier, a thickener, and a liquid medium to a collector;
    making a first slurry by blending a slurry medium and fines, the fines comprising concentrate mixed with tailings;
    adding the emulsion to the first slurry to make a second slurry; and
    removing the concentrate from the second slurry by sparging the second slurry,
    wherein the thickener and emulsifier are added to the collector in an amount such that the collector does not flocculate, and wherein the emulsifier is added to the collector in an amount so as not to completely surround droplets formed by the collector but in an amount sufficient to disperse the collector in the second slurry.

2. The method of claim 1, wherein the emulsion does not flocculate for at least 120 days.

3. The method of claim 1, wherein the emulsifier has a hydrophilic-lipophilic balance of at least 10.

4. The method of claim 1, wherein the emulsion comprises a second collector.

5. The method of claim 1, wherein the thickener has a reduced specific viscosity of at least 10 dL/g.

6. The method of claim 1, wherein the collector is selected from the group consisting of petroleum based oil products, natural lipids, modified natural lipids, hydrophobic organic compounds, and any combination thereof.

7. The method of claim 6, wherein the collector is a petroleum based oil product selected from the group consisting of fuel oils, decant oils, light cycle oils, paraffinic oils, naphthenic oils, mineral seal oils, mineral oils, residual or bottom of distillation, and any combination thereof.

8. The method of claim 6, wherein the collector is a natural lipid selected from the group consisting of animal fat, animal oil, vegetable oil, soybean oil, corn oil, linseed oil, cotton seed oil palm oil, coconut oil, and any combination thereof.

9. The method of claim 6, wherein the collector is a modified natural lipid selected from the reaction product of a lipid or mixture of lipids by trans-esterification, saponification followed by acidulation, or by inter-esterification.

10. The method of claim 6, wherein the collector is a hydrophobic organic compound selected from fatty acids, neutralized fatty acids, soaps, fatty amine compounds, low hydrophobic-lipophilic balance surfactants, hydrophobic polymers, silicone oils, xanthates, xanthogen formates, thionocarbamates, dithiophosphates, sodium salts of dithiophosphates, zinc salts of dithiophosphates, mercaptans, mercaptobenzothiazoles, ethyl octylsulfides, or any combination thereof.

11. The method of claim 1, wherein the second slurry comprises a frother.

12. The method of claim 1, wherein the emulsifier is selected from the group consisting of ethoxylated sorbitan esters, nonylphenol, soy lecithin, non-soy lecithin, sodium stearoyl lactylate, diacetyl tartaric acid ester of monoglyceride, surfactants, detergents, and any combination thereof.

13. The method of claim 1, wherein the collector is immiscible with the slurry medium.

14. The method of claim 1, wherein the ratio by weight of the collector to the emulsifier is greater than 25.7.

15. The method of claim 1, wherein the thickener is selected from polysaccharides, natural gums, vegetable gum, starch, pectin, proteins, collagen egg whites, furcellaran, gelatin, high molecular weight polymers, latex polymers, dry polymers, and polyacrylamide, natural gum derivative, or any combination thereof.

* * * * *